United States Patent
Bouchia et al.

(10) Patent No.: US 11,852,033 B2
(45) Date of Patent: Dec. 26, 2023

(54) ROTOR BLADE FOR A TURBOMACHINE

(71) Applicant: SAFRAN HELICOPTER ENGINES, Bordes (FR)

(72) Inventors: Youssef Bouchia, Moissy-Cramayel (FR); Laurent Pierre Tarnowski, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 0 days.

(21) Appl. No.: 17/760,018

(22) PCT Filed: Feb. 4, 2021

(86) PCT No.: PCT/FR2021/050213
§ 371 (c)(1),
(2) Date: Aug. 3, 2022

(87) PCT Pub. No.: WO2021/156577
PCT Pub. Date: Aug. 12, 2021

(65) Prior Publication Data
US 2023/0053734 A1 Feb. 23, 2023

(30) Foreign Application Priority Data
Feb. 7, 2020 (FR) .................................. 2001221

(51) Int. Cl.
*F01D 5/20* (2006.01)
*F01D 5/14* (2006.01)

(52) U.S. Cl.
CPC ............ *F01D 5/145* (2013.01); *F01D 5/20* (2013.01); *F05D 2220/323* (2013.01); *F05D 2240/307* (2013.01)

(58) Field of Classification Search
CPC .............................. F01D 5/20; F05D 2240/307
See application file for complete search history.

(56) References Cited

U.S. PATENT DOCUMENTS

| | | | | |
|---|---|---|---|---|
| 6,027,306 A | * | 2/2000 | Bunker | F01D 5/20 415/173.1 |
| 8,313,287 B2 | * | 11/2012 | Little | F01D 5/20 415/173.1 |

(Continued)

FOREIGN PATENT DOCUMENTS

| | | |
|---|---|---|
| EP | 0916811 A2 | 5/1999 |
| EP | 1980753 A1 | 10/2008 |

(Continued)

OTHER PUBLICATIONS

International Search Report received for PCT Patent Application No. PCT/FR2021/050213, dated Apr. 13, 2021, 5 pages (2 pages of English Translation and 3 pages of Original Document).

*Primary Examiner* — Eldon T Brockman
(74) *Attorney, Agent, or Firm* — WOMBLE BOND DICKINSON (US) LLP

(57) ABSTRACT

The invention relates to a rotor blade (10) for a turbomachine, in particular of an aircraft, comprising an airfoil (12) comprising a pressure face (15) and a suction face (17) extending from a leading edge (14) to a trailing edge (16), the airfoil (12) comprising an axis of elongation extending substantially along the leading (14) and trailing (16) edges, the airfoil (12) comprising a radially firmer end for connection to a rotor and a free radially outer end. According to the invention, the airfoil (10) further comprises at least one series of fins (24) situated on said free end, each of these fins (24) comprising a pressure face (26) situated on the suction face (17) side of the airfoil (12), and a suction face (28) situated on the pressure face (15) side of the airfoil (12).

14 Claims, 4 Drawing Sheets

(56) References Cited

U.S. PATENT DOCUMENTS

| | | | | |
|---|---|---|---|---|
| 9,464,536 B2* | 10/2016 | Zhang | ............... | F01D 11/006 |
| 10,883,373 B2* | 1/2021 | Hall | ............... | F01D 11/122 |
| 10,947,858 B2* | 3/2021 | Jung | ............... | F01D 11/08 |
| 2010/0166566 A1 | 7/2010 | Hatman | | |
| 2012/0201695 A1* | 8/2012 | Little | ............... | F01D 5/20 |
| | | | | 416/97 R |
| 2012/0230818 A1* | 9/2012 | Shepherd | ............... | F01D 5/20 |
| | | | | 415/208.1 |
| 2018/0355732 A1* | 12/2018 | Hall | ............... | F01D 11/122 |
| 2019/0078455 A1* | 3/2019 | Jung | ............... | F01D 11/006 |

FOREIGN PATENT DOCUMENTS

| | | | |
|---|---|---|---|
| EP | 2309098 A1 | 4/2011 | |
| FR | 2054402 A5 | 4/1971 | |

* cited by examiner

ROTOR BLADE FOR A TURBOMACHINE

TECHNICAL FIELD OF THE INVENTION

The present invention relates to a rotor vane for a turbomachine, in particular, for an aircraft. The field of the invention is that of turbomachine modules comprising a rotor equipped with several vanes, and in particular the modules of the turbine or compressor wheel type, mixed and/or centrifugal spinning wheels, axial, mixed and centrifugal compressors, as well as the modules comprising inlet guide vanes.

TECHNICAL BACKGROUND

The prior art comprises, especially, the documents FR-A5-2054402, EP-A-2309098, US-A1-2010/166566, EP-A2-0916811 and EP-A1-1980753.

In the subsonic or supersonic compression stages of turbomachines, vanes are used to enable fluid compression. Such a turbomachine vane classically comprises a blade comprising a pressure face and a suction face extending from a leading edge to a trailing edge. However, by design, there is a clearance between the head of the blade and the casing or cover. This clearance allows the passage of the fluid from the high-pressure side (pressure face) to the low pressure side (suction face), and is the source of secondary flows. Such secondary flows disturb the healthy flow and reduce the performance and compression efficiency of the compression stages.

There is therefore a need for a rotor vane for turbomachine that reduces secondary flows due to the operating clearance between the head of the blade and the casing or cover, while improving the aerodynamic performance of the vane.

In particular, the present invention is intended to solve some or all of the above problems.

SUMMARY OF THE INVENTION

To this end, the present invention proposes a rotor vane for a turbomachine, in particular of an aircraft, comprising an blade comprising a pressure face and a suction face extending from a leading edge to a trailing edge, the blade comprising an elongation axis extending substantially along the leading and trailing edges, the blade comprising a radially inner end for connection to a rotor and a radially outer free end.

According to the invention, the vane further comprises at least one series of fins located on said free end, each of these fins comprising a pressure face located on the side of the suction face of the blade, and a suction face located on the side of the pressure face of the blade.

The invention thus allows, thanks to such a configuration of the fins, to create a pressure gradient opposite to the circulation of the flow of clearance which circulates from the face in pressure (pressure face) of the blade towards the face in depression (suction face) of the latter. In fact, such fins whose curvature is reversed with respect to that of the blade act as screens by preventing the fluid from being able to flow from the face in pressure (pressure face) to the face in depression (suction face) in the clearance zone. This increases performance (flow rate, rate) and isentropic efficiency by minimizing the blade head clearance flows. The opposite pressure gradient is created through the choice of the curvature of the fins. Moreover, the presence of such fins thus configured allows to obtain an aerodynamic gain by controlling the vortex at the blade head, which contributes to improve the performance and/or the stability of the module comprising the vane. Such an aerodynamic gain becomes essential, for example, when the blades are very small. Finally, the present invention allows to obtain a gain in stability for axial compressors, as well as an increase in the total pressure rate of the rotor.

The vane according to the invention may comprise one or more of the following features, taken alone or in combination with each other:
- the fins of the or each row are arranged one behind the other along a chord of the free end of the blade;
- the vane comprises one series of fins;
- the cumulative lengths of the chords of the fins are between 80% and 120% of a chord of the free end of the blade;
- the number of fins in said or each series is between 2 and 10, and preferably between 4 and 8, in particular for an axial compressor;
- the number of fins in said or each series is a function of the chord of the vane, especially for a centrifugal compressor;
- each of the fins has a height measured along said axis of elongation that is between 1 and 10%, and preferably between 1 and 5%, of the height of the blade measured along the same axis; and
- each of the fins is inclined with respect to said elongation axis and/or is twisted around this elongation axis.

The invention also relates to a turbomachine module, in particular for an aircraft, this module comprising a rotor comprising an annular row of vanes as described above.

The turbomachine module according to the invention may comprise one or more of the following features, taken alone from each other or in combination with each other:
- the turbomachine module is selected from a turbine wheel or compressor wheel, a mixed or centrifugal spinning wheel, and a fan; and
- the rotor is surrounded by an annular coating made of abradable material which is housed in a groove of an annular casing, this groove being formed in an inner cylindrical surface of the casing which has an inner diameter substantially equal to the diameter of the rotor passing through the free ends of the blades of the vanes.

The invention also relates to an aircraft turbomachine, comprising at least one vane as described above.

BRIEF DESCRIPTION OF THE FIGURES

Further features and advantages of the invention will become apparent from the following detailed description, for the understanding of which reference is made to the attached drawings in which.

DETAILED DESCRIPTION OF THE INVENTION

Figure 1:
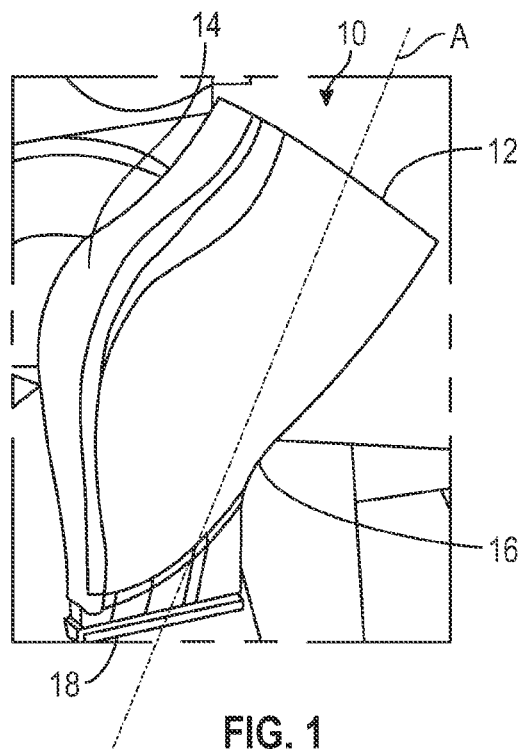
FIG. 1 is a schematic perspective view of a turbomachine rotor vane, and in particular of a turbomachine fan.

FIG. 1 shows a rotor vane 10 of a turbomachine and in particular of a fan of an aircraft turbomachine. This vane 10 comprises a blade 12 which comprises a leading edge 14 and a trailing edge 16, opposite the leading edge.

The blade 12 has an aerodynamic profile and includes a pressure face 15 and a suction face 17 extending between the leading 14 and trailing 16 edges of the blade.

The vane 10 has an axis of elongation noted A. In the present application, the axis of elongation of the blade is understood to be the axis that extends substantially along the leading and trailing edges 14, 16 of the blade 12, and in particular between the leading and trailing edges.

One longitudinal end of the blade 12 is free and the opposite longitudinal end is connected, for example, to a root 18 for attachment of the vane to a rotor of the turbomachine.

Figure 2:
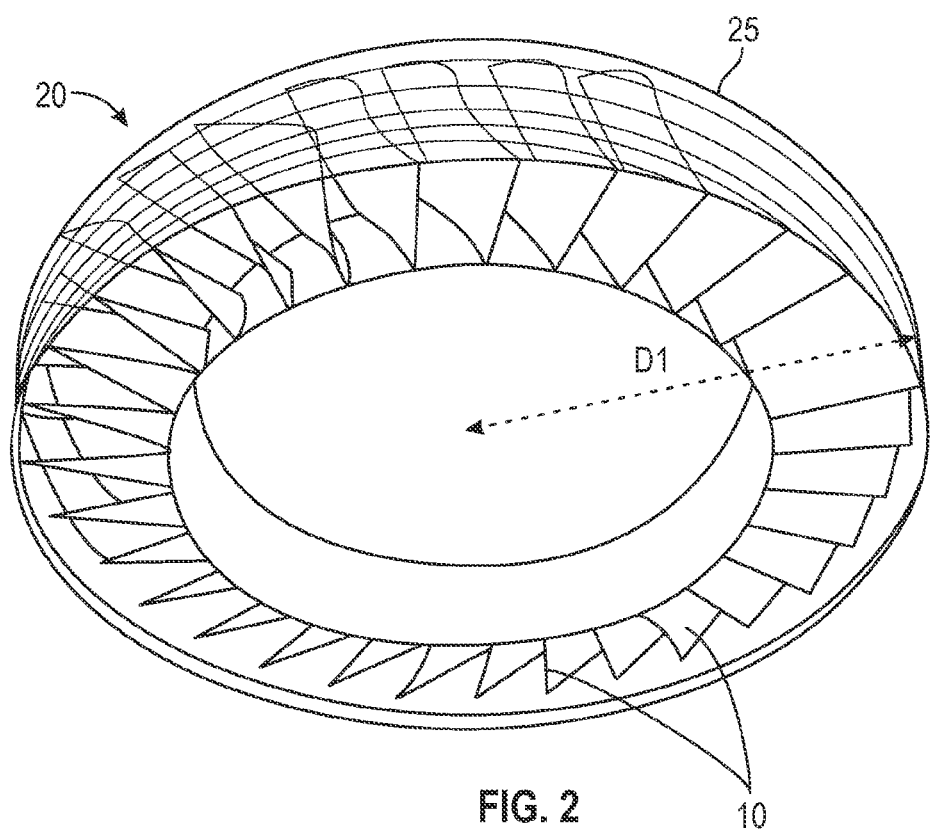
FIG. 2 is a perspective view of a turbomachine module equipped with a rotor comprising an annular row of vanes according to the invention.

FIG. 2 and following illustrate embodiments of the invention.

Figure 6:
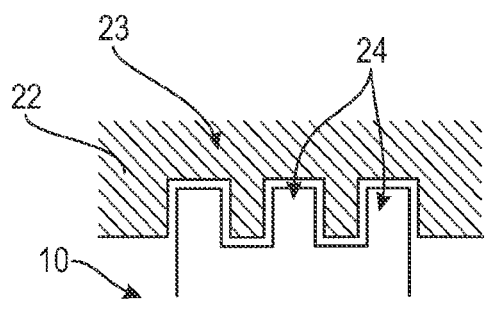
FIG. 6 is a magnified view of a portion of the vane in FIG. 5, showing three of the fins of the vane.

FIG. 2 shows a module 20 having a rotor comprising an annular row of vanes 10 according to the invention. Preferably, and as illustrated in FIG. 6, the module 20 also includes an annular coating 22 made of abradable material which is housed in a groove 23 of an annular casing 25 (the casing 25 being visible in FIG. 2). The groove 23 is formed in an inner cylindrical surface of the casing 25 which has an inner diameter D1 substantially equal to the diameter of the rotor passing through the free ends of the blades 12 of its vanes 10. The module 20 is, for example, a turbine or compressor wheel, a mixed or centrifugal spinning wheel, or a fan. An axial compressor has an axial inlet and an axial outlet, a mixed spinning wheel has an axial inlet and an inclined outlet, and a centrifugal spinning wheel has an axial inlet and a radial outlet.

Figure 3:
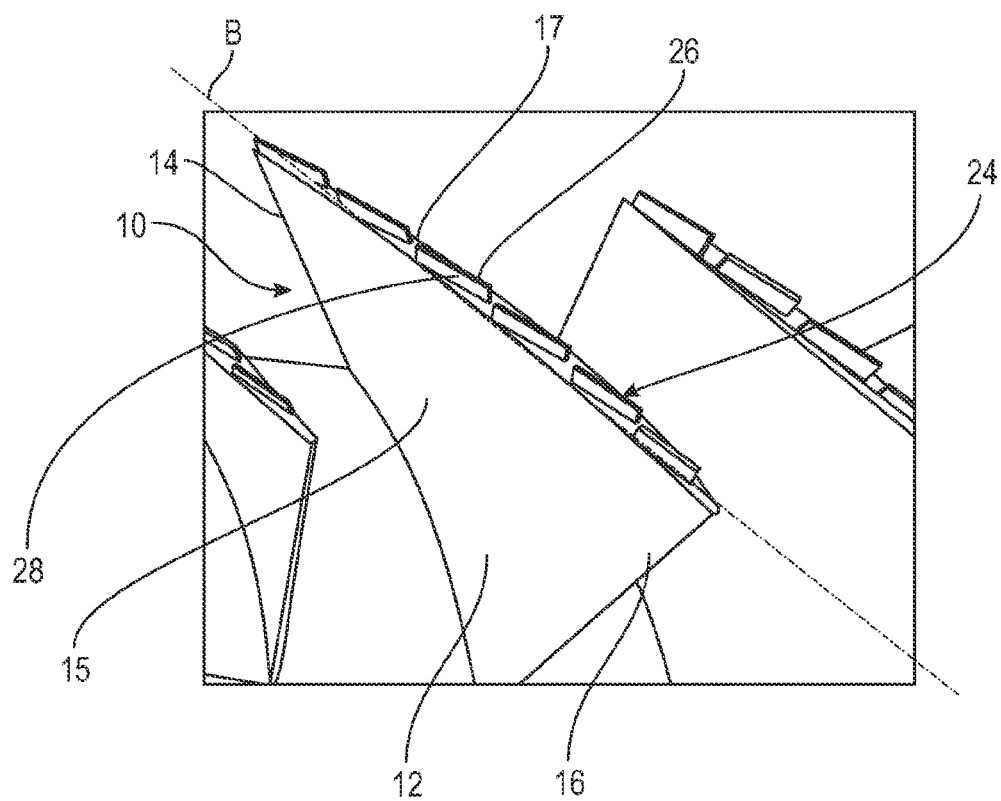
FIG. 3 is a magnified view of a portion of the module of FIG. 2, showing one of the vanes of the rotor, the vane comprising a series of fins.
Figure 4:
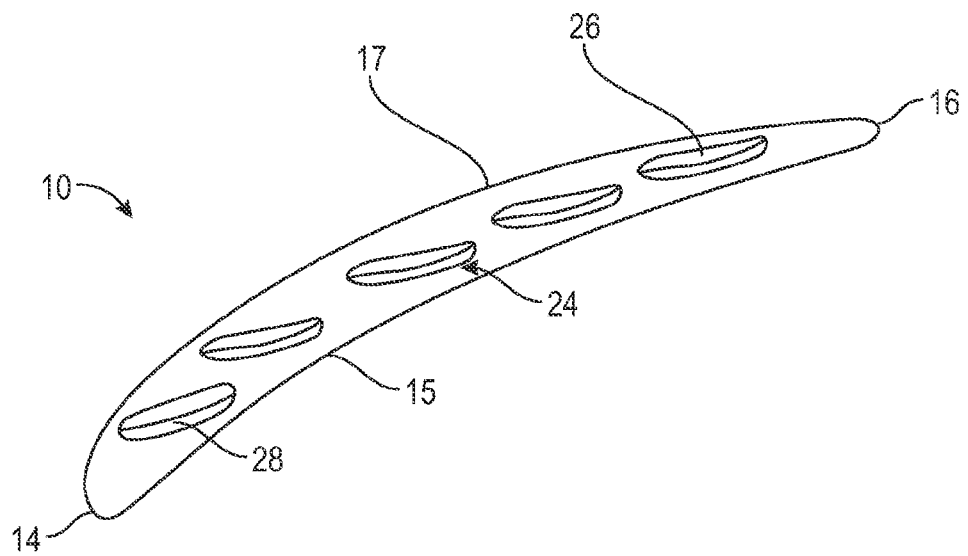
FIG. 4 is a top view of the free end of the vane in FIG. 3.
Figure 5:
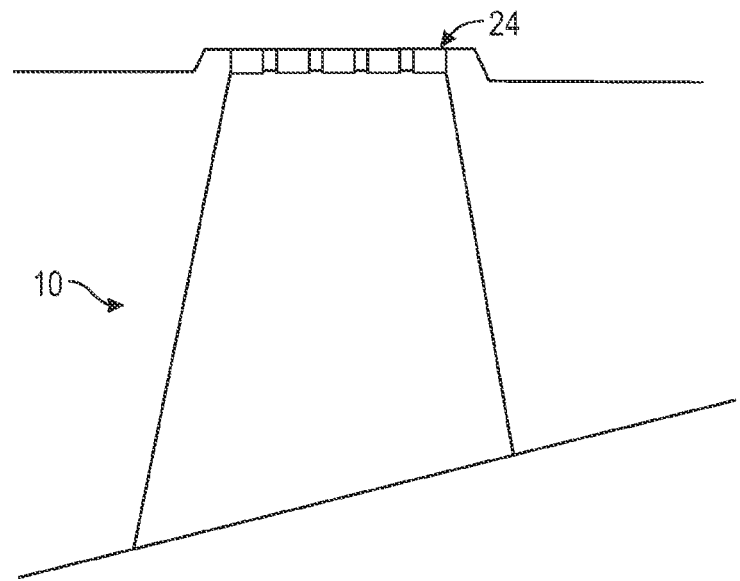
FIG. 5 is a meridian cross-sectional view of the vane in FIG. 3.

FIGS. 3 and 4 show the free end of one of the vanes 10 according to the invention. This free end shows the aerodynamic profile of the blade 12. As used in this application, "chord" means the imaginary straight line connecting the leading edge 14 to the trailing edge 16 of the blade. A chord B may be drawn, as shown in FIG. 3, on the free end of the blade 12. However, such a chord may be drawn on any cross-section of the blade made perpendicular to the aforementioned axis of elongation A. The vane 10 comprises at least one series of fins 24 located on the free end of the blade 12. Preferably, the number of fins 24 in the or each series is between 2 and 10, and preferably between 4 and 8. In the particular embodiment shown in FIGS. 3 to 5, the vane 10 comprises one series of six fins 24. Preferably, and as visible in FIGS. 3 through 5, the fins 24 in each row are arranged one behind the other along the chord B of the free end of the blade 12. The vanes 10 may be fitted to an axial compressor, for example, of an aircraft turbomachine.

The fins 24 are preferably attached to the free end of the blade 12, for example via an additive machining method. By additive machining, we mean a method comprising a material deposition step to create a preform of the fins, and a machining step of this preform to create a final shape of the fins.

As illustrated in FIGS. 3 and 4, each of the fins 24 comprises a pressure face 26 located on the suction face 17 side of the blade 12, and an suction face 28 located on the side of the pressure face 15 side of the blade 12. Preferably, the cumulative chord lengths of the fins 24 are between 80% and 120% of the chord B. Even more preferably, each fin 24 has a height measured along the axis of elongation A that is between 1 and 10%, and preferably between 1 and 5%, of the height of the blade 12 measured along the same axis.

FIG. 6 illustrates a particular embodiment where the fins 24 are accommodated by the presence of the annular coating 22 of abradable material which is housed in a groove 23 of the annular casing 25.

Figure 7:
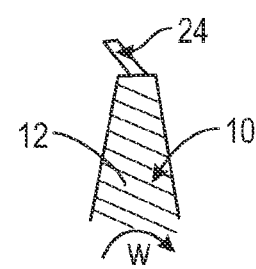
FIG. 7 is a profile view of one of the fins in FIG. 5.

According to a particular embodiment shown in FIG. 7, each fin 24 is inclined with respect to the axis of elongation A. In this embodiment, the arrow w indicates the direction of rotation of the vane 10. The fins 24 are inclined towards the side of the vane 10 opposite to the direction of rotation of the latter. Alternatively, not shown, each fin 24 may be twisted about the axis of elongation A.

In operation, the fins 24 create a pressure gradient opposite to the flow of clearance flowing from the pressure face 15 of the blade 12 to the suction face 17 of the blade 12. This is due to the fact that the pressure face 26 of the fins 24 faces the suction face 17 of the blade 12, and vice versa. Such a configuration of the fins 24 prevents fluid from being able to flow from the pressure side (pressure face 15) to the depression side (suction face 17) of the blade 12 in the clearance area. This advantageously increases performance (flow rate, rate) and isentropic efficiency, while minimizing blade head clearance flows. The opposite pressure gradient is created through the choice of the curvature of the fins. In addition, the presence of such fins 24 thus configured allows to obtain an aerodynamic gain by controlling the vortex at the blade head, which contributes to improving the performance and/or the stability of the module 20 comprising the vane 10. Such an aerodynamic gain becomes essential, for example, when the blades 12 are very small. Finally, the present invention allows to obtain a gain in stability for axial compressors, as well as an increase in the total pressure rate of the rotor.

Figure 8:
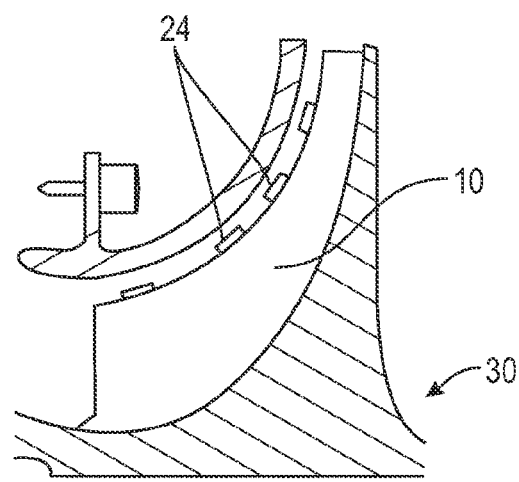
FIG. 8 is a meridian cross-sectional view of a vane of a spinning wheel.

FIG. 8 illustrates the application of the invention to a centrifugal spinning wheel 30. Each vane 10 of the spinning wheel 30 includes a number of fins 24 which may be a function of the chord of that vane.

The invention claimed is:

1. A rotor vane for a turbomachine, in particular of an aircraft, comprising a blade comprising a pressure face and a suction face extending from a leading edge to a trailing edge, the blade comprising an elongation axis extending substantially along the leading and trailing edges, the blade comprising a radially inner end for connection to a rotor and a radially outer free end,
    wherein the blade further comprises at least one series of fins located on said free end, each of these fins comprising a pressure face located on the side of the suction face of the blade, and a suction face located on the side of the pressure face of the blade,
    wherein ends of each of the fins are spaced from the suction face and pressure face of the blade.

2. The rotor vane according to claim 1, wherein the fins of the or each row are arranged one behind the other along a chord of the free end of the blade.

3. The rotor vane according to claim 1, wherein it comprises a single series of fins.

4. The rotor vane according to claim 1, wherein the cumulative lengths of the chords of the fins are between 80% and 120% of a chord of the free end of the blade.

5. The rotor vane according to claim 1, wherein the number of fins in the or each series is between 2 and 10.

6. The rotor vane according to claim 1, wherein each of the fins has a height measured along said elongation axis which represents between 1 and 10%, of the height of the blade measured along the same axis.

7. The rotor vane according to claim 1, wherein each of the fins is inclined with respect to said elongation axis.

8. A turbomachine module, in particular for an aircraft, said module comprising a rotor comprising an annular row of rotor vanes according to claim 1.

9. The turbomachine module according to claim 8, wherein the module is selected from a turbine or compressor wheel, a mixed or centrifugal spinning wheel, and a fan.

10. The turbomachine module according to claim 8, wherein the rotor i-s-vanes are surrounded by an annular coating of abradable material which is housed in a groove of an annular casing, this groove being formed in an inner cylindrical surface of the casing which has an inner diameter substantially equal to the diameter of the rotor passing through the free ends of the blades of its vanes.

11. An aircraft turbomachine, comprising at least one rotor vane according to claim 1.

12. The rotor vane according to claim 1, wherein each of the fins is twisted around the elongation axis.

13. The rotor vane according to claim 1, wherein each of the fins is inclined towards a side of the rotor vane opposite to the direction of rotation of said rotor vane.

14. The rotor vane according to claim 1, wherein lengths of chords of the fins extend in a perpendicular direction according to the pressure and suction faces of the blade.

\* \* \* \* \*